United States Patent [19]
Carroll

[11] 3,777,807
[45] Dec. 11, 1973

[54] APPARATUS FOR TEMPERING CHOCOLATE
[75] Inventor: Lee Carroll, Philadelphia, Pa.
[73] Assignee: W. C. Smith & Sons, Inc., Philadelphia, Pa.
[22] Filed: Sept. 10, 1971
[21] Appl. No.: 179,479

[52] U.S. Cl. .................................. 165/26, 165/64
[51] Int. Cl. ........................................... F25b 29/00
[58] Field of Search ......................... 165/17, 64, 26

[56] References Cited
UNITED STATES PATENTS
2,255,986 9/1941 Rapisakda ............................. 165/64
3,215,192 11/1965 Sollich ................................. 165/17

Primary Examiner—Charles Sukalo
Attorney—Wolfe, Hubbard, Leydig, Voit & Osann, Ltd.

[57] ABSTRACT

An apparatus is provided for tempering liquid chocolate to be used in the manufacture of confections or the like. Such tempered chocolate may, for example, be fed to a machine for applying chocolate coatings to candy pieces, bars and other articles, or it may be fed to a molding machine or to a hand worked production station. The chocolate becomes tempered to precisely the proper temperature, consistency and type and degree of crystallization by carefully and selectively treating it in a tube within a tube heat exchanger using alternate and controlled heating and cooling cycles.

10 Claims, 4 Drawing Figures

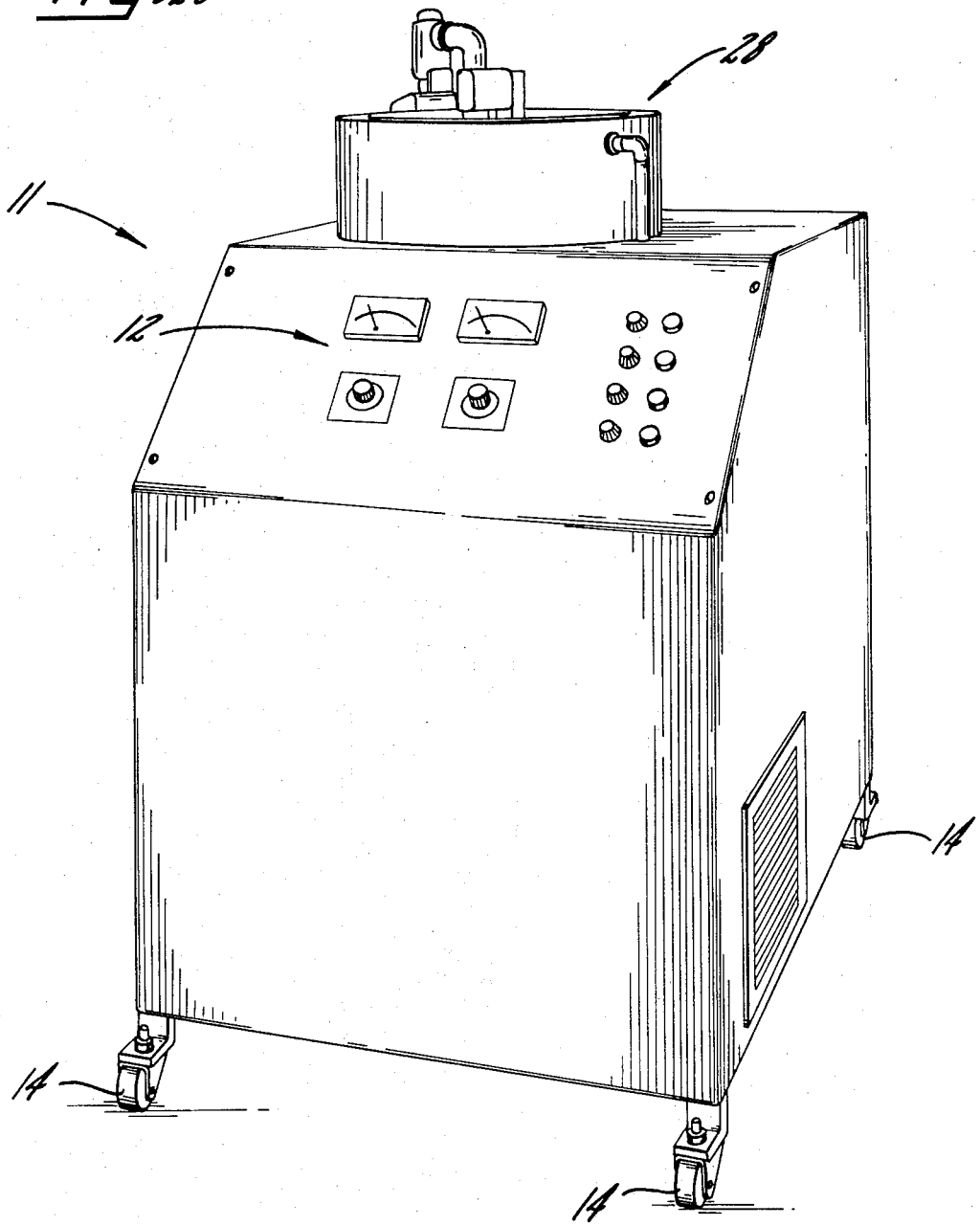

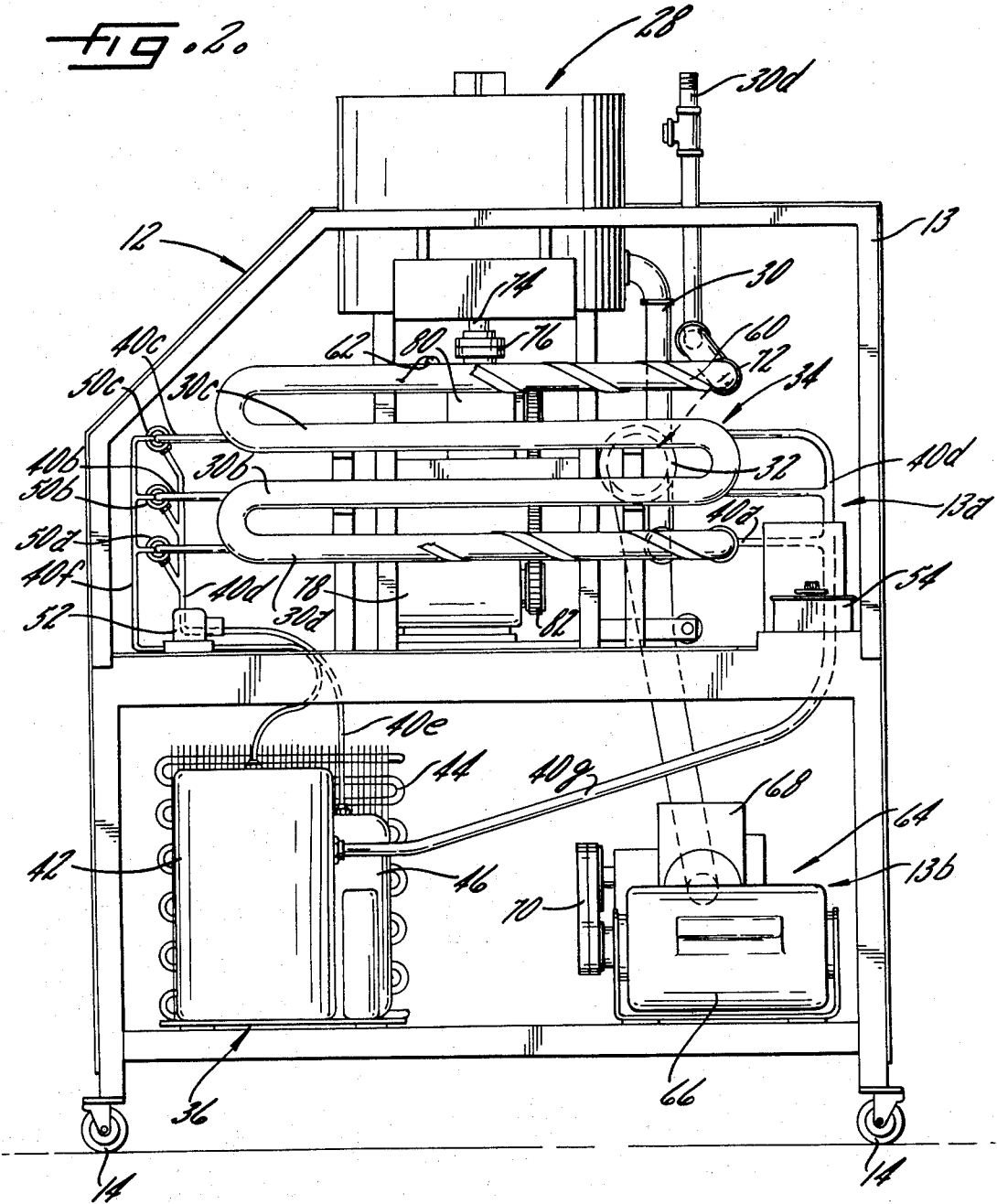

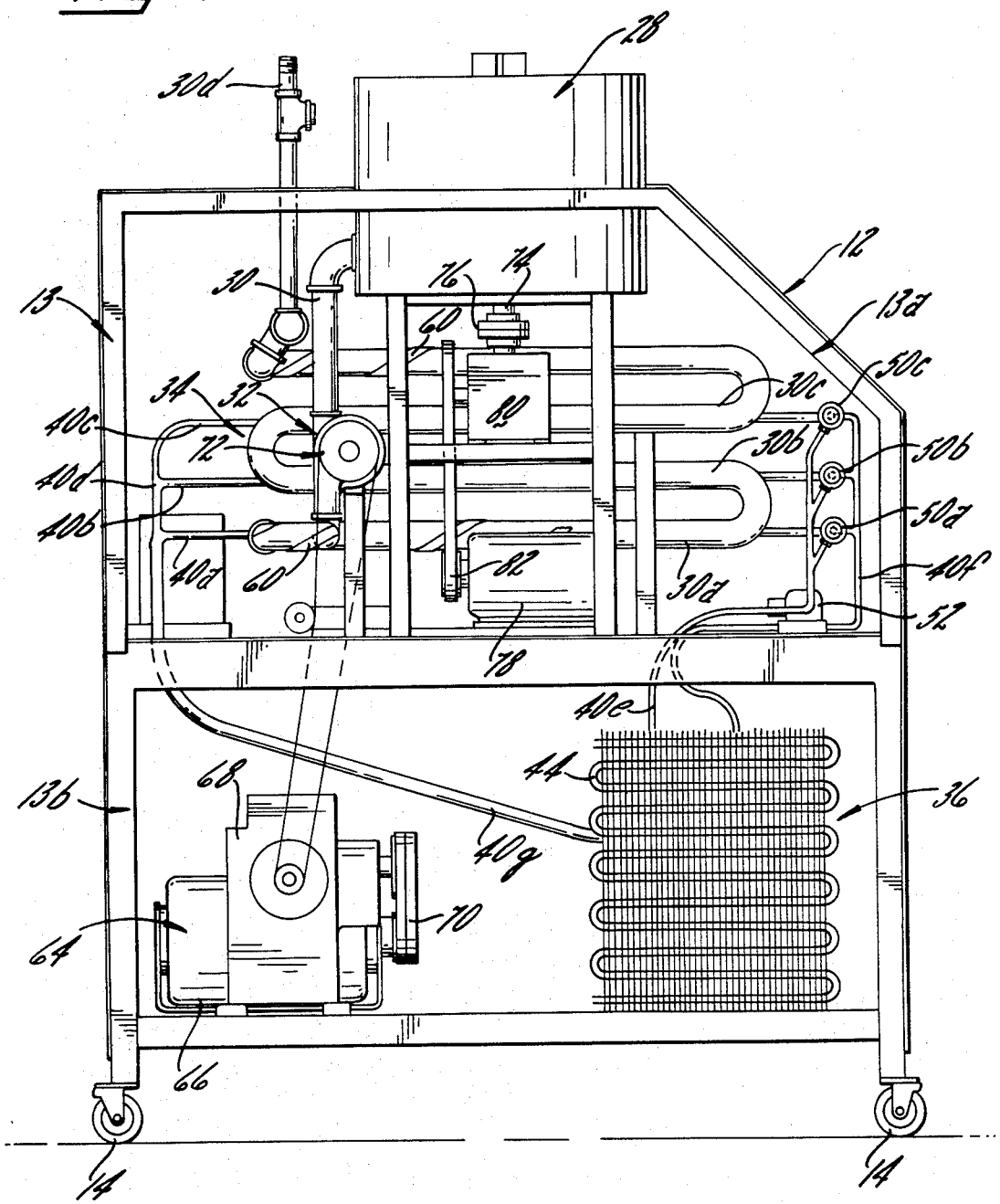

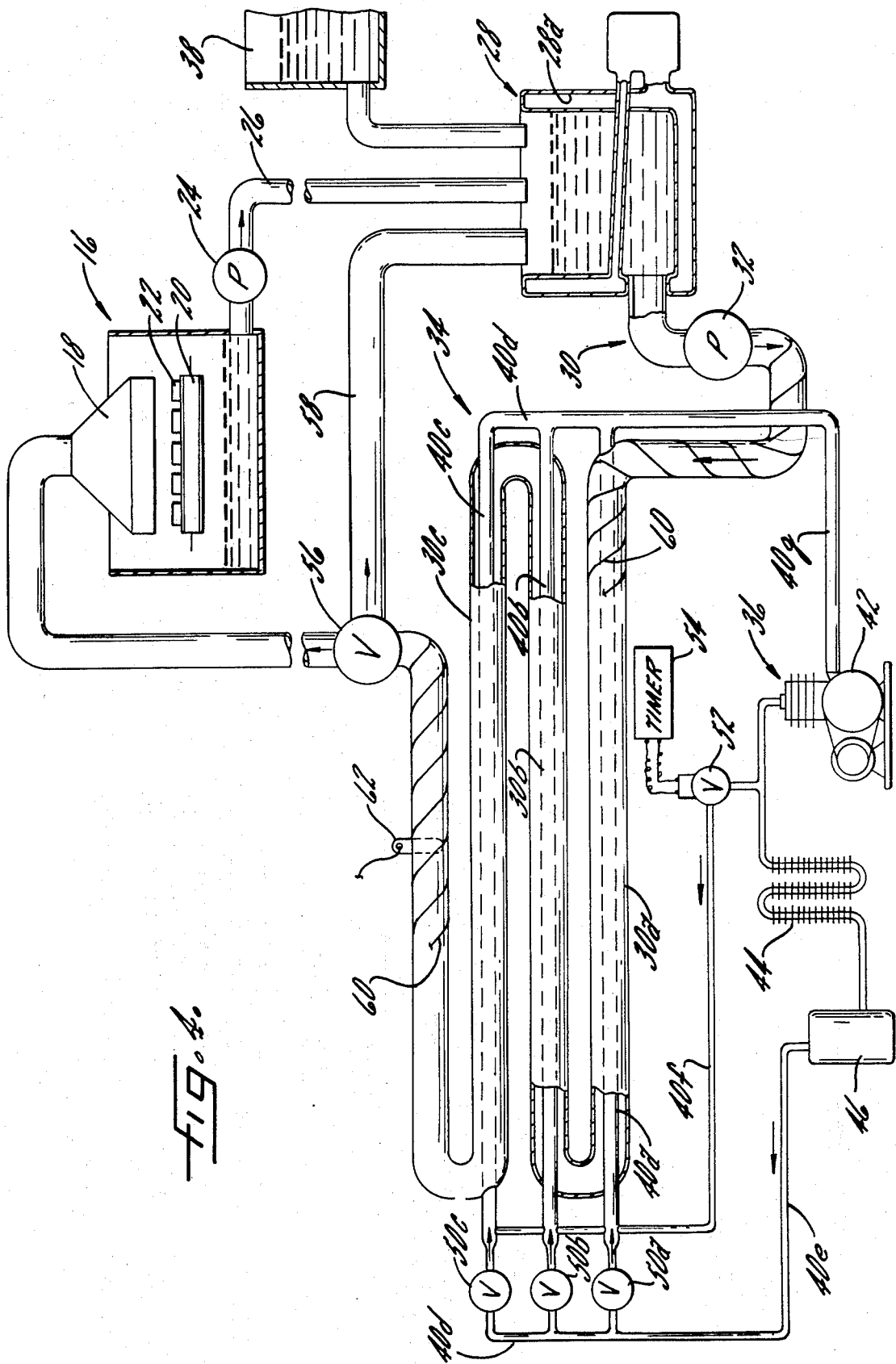

3,777,807

APPARATUS FOR TEMPERING CHOCOLATE

DESCRIPTION OF THE INVENTION

This invention relates to an apparatus for efficiently and effectively tempering or conditioning liquid chocolate. In one of its forms the invention relates particularly to preparation of tempered chocolate for use in coating applications requiring a continuous flow of chocolate from a reservoir to a chocolate coating machine with return of the unused excess chocolate from the machine back to the reservoir.

In the commercial manufacture of confections such as chocolate coated cookies, candy pieces, candy bars and the like, coating of these articles with liquid chocolate is carried out under carefully controlled conditions of temperature and viscosity of the chocolate. The resulting chocolate, known as "conditioned" or "tempered" chocolate, is fed to any of a wide variety of confectionery manufacturing machines. Such machines in commercial use include chocolate coaters or enrobers, bottomers, and molding machines.

Chocolate has been conditioned in the past by maintaining it at a temperature of about 90°F. and bringing it to a state of incipient crystallization (of the fatty components of the cocoa butter). In practice, however, a major problem has been encountered in arriving at the proper degree and form of crystallization, and consequently at the proper temper of the chocolate. Part of the problem arises from the fact that heat given off during crystallization of the chocolate must be controllably dissipated or removed from the chocolate mass being tempered. For use in commercial coating or molding equipment the chocolate must have the proper flow characteristics and yet must quickly dry or set up on the coated articles. Also, desirably the chocolate should set up shiny, and should not discolor (e.g. turn white or gray) with time. All of these factors depend to a greater or lesser extent upon achieving the proper temper of the chocolate.

The problem of arriving at the proper temper of the chocolate is accentuated in certain types of commercial chocolate coating operations, such as enrobers. Typically, in these operations a large excess of tempered chocolate is kept available from which only a relatively small amount is used to coat the articles being passed through the coater. Tempered liquid chocolate is continuously circulated over the bars or pieces being coated, with only a small portion of the chocolate being retained on the coated articles. Most of the chocolate runs off and falls into a sump from which it is circulated back to a reservoir for re-use. The small portion of chocolate used to coat the articles must be replaced by addition of fresh new chocolate to the circulating system. The condition of the fresh chocolate and manner of adding it are variables that must be taken into account in providing a chocolate feed to the coater that is properly tempered.

Various prior techniques have been advanced in attempts to arrive at the proper temper of the chocolate being used in commercial confectionery manufacturing equipment under the operating conditions encountered in such equipment. Such techniques have resulted in use of bulky and expensive apparatus, and have failed to assure complete and consistent control of the temper of the chocolate.

A primary object of the present invention is to overcome the disadvantages of prior techniques by providing liquid chocolate of precisely the proper uniform temperature, consistency and form and degree of crystallization for feed to a confectionery manufacturing machine.

An ancillary object is to provide apparatus for tempering chocolate by causing the desired type and degree of crystallization to occur through precise and controlled sequential heating and cooling of the chocolate in a tube within a tube heat exchanger using a liquid-gas refrigeration and heating system.

A related object is to produce properly tempered chocolate having a high degree of desirable crystallization at higher temperatures than heretofore, so that the tempered chocolate has a lower viscosity with consequent ease of pumping and resultant lower machine operating costs.

Other objects and advantages of the invention will become apparent upon reading the following detailed description and upon reference to the drawings, in which:

FIG. 1 is a perspective front view of an apparatus incorporating the present invention enclosed in an outer casing;

FIGS. 2 and 3 are right and left side elevations, respectively, of the apparatus shown in FIG. 1 but with the outer casing removed; and FIG. 4 is a somewhat diagrammatic side elevational view of an apparatus incorporating the invention, shown in conjunction with a typical continuous feed type chocolate coating machine.

Turning to the drawings, there is shown in FIG. 1 a front view of a chocolate tempering apparatus 11 illustrative of the invention. A front control panel 12 includes temperature and heating and cooling cycle controls and indicators. The unit as shown is portably mounted on casters 14 for ready use with different confectionery machines.

Before describing the structure shown in FIGS. 2 and 3 it will be helpful to an understanding of the invention to refer to FIG. 4. There is shown in that drawing a diagrammatic depiction of a typical chocolate coating or enrobing machine 16, along with the main components of the apparatus utilizing the present invention for tempering chocolate to be fed to the coating machine. The chocolate coating machine 16 is set up with a continuous feed of chocolate to the machine and provides continuous discharge from the machine of excess chocolate.

The enrobing machine 16 is of a typical construction used commercially. It includes a chocolate feed inlet 18, a chain type conveyor 20 adapted to move horizontally through the enrober and carrying articles 22 to be coated, and a pump 24 for withdrawing unused excess chocolate run-off from the conveyor and transporting it through an exit conduit 26 for return to a heated chocolate reservoir 28 which forms a part of the tempering apparatus. In this type of coating equipment the reservoir 28 is sized large enough that a high ratio is maintained between the quantity of chocolate being circulated in the tempering apparatus and the quantity being used up as coating.

As will be seen, the tempering apparatus includes the liquid chocolate reservoir 28, a continuous conduit of wide diameter piping 30 connected between the reservoir and the coating machine 16, a pump 32 for transporting chocolate from the reservoir to the coating machine through the conduit 30, a tempering chamber 34 associated with a portion of the piping 30 for controllably and selectively heating or cooling the liquid chocolate as it passes from the reservoir to the coating machine, and a closed circuit heat exchanger tube system 36 for providing liquid cooling or gas heating as desired to the tempering chamber.

The overall liquid chocolate flow circuit is thus as follows. From the reservoir 28 the chocolate is pumped (via pump 32) through the continuous conduit 30 thereby passing through the chamber 34 where tempering takes place as will be described below. The tempered chocolate then continues on and is fed to the chocolate coating machine 16. Excess, unused chocolate from the coating machine passes through the exit conduit 26 and returns to the reservoir 28.

For feeding fresh or new chocolate to the reservoir 28 to replace the chocolate used in the coating machine a melting and holding tank 38 is provided. This tank, which is associated with and discharges into the reservoir 28, includes provision for heating the newly added chocolate as desired. It may also include a water jacket or other provision for cooling the chocolate.

In carrying out the invention the tempering chamber 34 constitutes a tube within a tube type heat exchanger adapted to heat treat the liquid chocolate flowing within the continuous conduit 30. As depicted in FIG. 4, the piping 30 is formed as a labyrinth having several, in this case three, parallel straight portions or passes, 30a, 30b and 30c. Concentrically disposed within each of the straight portions 30a, 30b and 30c of the conduit are heating or cooling tubes 40a, 40b and 40c, respectively, which are connected together through manifolds 40d into a separate, closed piping circuit for providing heating gas or cooling liquid to the tempering chamber 34. The tubes 40a, 40b, 40c, and manifolds 40d form part of an otherwise conventional heating and refrigerating system which includes a compressor 42, an air-cooled condenser 44, a receiving tank 46 for liquid refrigerant, and connecting piping including liquid 40e and gas 40f lines from the compressor and a suction line 40g return to the compressor. Automatic expansion valves 50a, 50b, 50c are associated with each of the heating-cooling tubes for control purposes, and a solenoid valve 52 and time responsive electrical control means 54 are provided for regulating the flow of hot gas or cool liquid in the heating-cooling system. Thus the net effect achieved is that of a tube within a tube heat exchanger and liquid-gas refrigeration-heating system combination which functions as described below to properly temper the chocolate passing through the conduit 30.

Typical operation of the apparatus illustrative of the invention is as follows. Preliminarily, new or fresh chocolate is introduced to the heated melting and holding tank 38, and is brought to a liquid condition at a temperature of about 120°F. At this temperature all pre-existing crystals in the chocolate become dissolved. The chocolate is then permitted to cool while still in the melting and holding tank by standing at room temperature, or via a tank cooling jacket, to about 95°F.

The resulting hot, untempered liquid chocolate is then drained into the reservoir 28. By means of circulation of mineral oil through an exterior jacket 28a of the reservoir, the temperature of the chocolate in the reservoir is reduced to about 90°F. At this point no appreciable crystallization has taken place as yet in the chocolate. It may be desirable to provide a suitable mixer, such as a paddle type, to mildly circulate the liquid chocolate within the reservoir.

The chocolate is then transferred via the pump 32 from the reservoir 28 through the continuous conduit 30, passing through the tempering chamber 34 and then into the coating machine 16.

Volume control of the chocolate pumped through the system and fed to the coating machine is provided by the combination of a variable speed drive for the pump 32 and a bypass arrangement around the coater 16 which includes a three-way valve 56 in the conduit 30 for diverting part of the flow back through a line 58 for return to the reservoir 28 as desired. In this way a pre-selected pumping volume of chocolate emerging from the tempering chamber 34 may be completely channeled to the coating machine 16, or it may be partially fed to the coater with the remainder being recycled to the reservoir 28 to be reheated and passed into the system again.

During its passage from the reservoir 28 to the coater 16 the chocolate is subjected in the tempering chamber 34 to an initial cooling treatment followed by heat treatment, all of which is carefully controlled to bring about the proper temper of the chocolate. As will be seen from FIG. 4, the cooling-heating system is designed such that a heat transfer fluid, such as Freon 12 or Carrene R-500 or the like, may be circulated through the piping 40 either in its refrigerated liquid form or hot gas form. The automatic expansion valves 50a, 50b and 50c close during the hot gas cycle and open for the liquid cycle. The heat transfer fluid is then returned via the suction line 40g to the compressor 42.

In the first phase of the tempering treatment, the refrigeration cycle, cool liquid refrigerant at about 25°F. is circulated through the piping system 40. Its path takes it from the compressor 42 through the condenser 44 (the solenoid valve 52 is closed), through the receiving tank 46 and into the tempering chamber 34 via the line 40e and the open valves 50a, 50b and 50c. The resulting gaseous refrigerant is returned to the compressor through the line 40g. Preferably the coolant or refrigerant is circulated in a direction counter-current to the chocolate flow within the conduit 30.

As the chocolate is cooled below about 90°F. crystallization begins to occur on the outer surfaces of the tubes 40a, 40b and 40c. In the first heat exchanger pass (i.e. tube 40a) the chocolate is cooled somewhat below 90°F. In the second pass (tube 40b) the chocolate temperature drops to about 80°F. In the third pass (tube 40c) the chocolate temperature rises back to about 85°F., probably as a result of the heat of crystallization being liberated faster than the refrigeration system can effect cooling. At this point extensive crystallization of the chocolate has taken place and it becomes desirable to restore the chocolate to a state of flowability and incipient crystallization.

Preferably, the automatic expansion valves 50a, 50b and 50c are adjustable and may be pre-set independently of one another to limit the size of their openings as desired. It is thus possible to control the flow of liquid refrigerant through each of the separate heat exchanger stages 40a, 40b and 40c independently of the others. As a result heat transfer within each of the heat exchanger stages may be precisely controlled to quickly and efficiently bring about the conditions necessary for achieving the desired temper of the chocolate.

The second phase of the tempering treatment follows. After a pre-determined time of refrigeration, the electrical timing control 54 opens the solenoid valve 52 and thereby switches the output of the compressor 42 from cool liquid to a hot gas stream. This automatically closes the expansion valves 50a, 50b and 50c, and the hot gas passes through the line 40f and into the heat exchanger tubes 40a, 40b and 40c, again in countercurrent direction, bringing about reheating of the highly crystalline chocolate within the tempering chamber 34. The chocolate is heated back to a temperature of about 90°F. or 91°F., resulting in dislodging and at least partial dissolution of the crystals adhering to the outer surfaces of the tubes 40a, 40b and 40c. After a pre-determined period of reheating the chocolate is found to be precisely and properly tempered as desired for feed to the coater 16 or recycle back to the reservoir 28 as described previously.

The cooling-heating timing cycle may be set as desired depending upon the various parameters, such as the composition of the chocolate being used, the relative capacities of the heat exchange system and throughput piping, and the extent of recycle. Using the illustrated apparatus described herein it has been found that a cooling cycle of about 11 seconds duration followed by a reheating cycle of about the same duration is feasible for some conditions; for others a longer heating cycle is desirable such as 8 seconds for heating and 3 seconds for cooling. Most desirably the timer arrangement 54 provides independently adjustable cooling and heating cycles to afford desirable flexibility in use of the apparatus.

Under some circumstances it has been found desirable, where very fine temperature adjustment of the tempered chocolate is required, to provide for additional heat to be supplied to the tempered chocolate. This may be accomplished, as shown in FIG. 4, by a wrapping of electrical resistance type tape 60 placed around the exterior of part or all of the conduit 30. The tape 60 is electrically connected to a thermostat probe 62, inserted into the conduit 30 on the downstream side of the heat tape and in thermal contact with the flowing chocolate, and to a suitable controlled supply of electric current, preferably of pulsating current type. The heat tape serves as an additional fine temperature control for tempering the chocolate, and also can be used to prevent freezing of the chocolate in the conduit when the apparatus is shut down.

Turning now to FIGS. 2 and 3, it will be seen that the illustrative apparatus incorporating the features of the invention is mounted within a metal frame 13 having upper and lower sections 13a, 13b, respectively. Arranged within the lower section 13b on one side is a drive unit 64 for the chocolate pump 32. On the other side the compressor 42, condenser 44 and receiving tank 46 associated with the heating and refrigerating system 36 are located. The drive unit 64 includes a motor 66 and gear box 68 drivingly connected together by means of a variable speed belt drive 70. The drive output of the gear box 68 is transmitted to the chocolate pump 32, mounted in the upper section 13a of the frame, through a chain and sprocket arrangement 72.

The upper section 13a of the frame holds the other main components of the chocolate tempering apparatus 11. A jacketed chocolate reservoir 28 is mounted in the top portion of the frame and is adapted to be fed liquid chocolate from a suitable melting and holding tank 38 (not shown). The reservoir as shown is provided with an internal paddle type stirrer (not visible) driven from below through a vertical shaft 74 and coupling 76 by a motor 78 and gear box 80 combination connected by a chain drive 82.

In operation, the chocolate discharge from the reservoir 28 flows downwardly into the conduit 30 and thence into the pump 32 which forces it through the entire conduit labyrinth and through the tempering chamber 34. The resulting tempered chocolate ultimately passes upwardly through the vertical riser 30d and is fed to a chocolate confectionery machine (not shown).

The details of the illustrative tempering chamber 34 and heat exchanger system 36 are best shown in FIG. 2. The heat transfer fluid piping inlets 40e (cool liquid) and 40f (hot gas) to the heat exchanger are shown on the left hand side of FIG. 2, and the inlet and outlet manifolds 40d appear on the left and right hand sides, respectively. The suction return line 40g to the compressor 42 is most clearly visible in FIG. 3. The upper section 13a of the frame also contains the solenoid controlled valve 52 and electrical timer arrangement 54. The operator's controls and gauges appear on the control panel 12.

Also shown in FIGS. 2 and 3 is an illustrative way in which the heat tape 60 may be wrapped around the conduit 30. It may also be desirable to provide exterior insulation, perhaps in the form of reflective insulating paper (not shown), wrapped around the conduit U-bends of the heat exchanger and possibly around the portion of the conduit 30 downstream of the tempering chamber 34.

The three-way valve 56 and return line 58 to the chocolate reservoir 28 are not shown in FIGS. 2 and 3, but they are located in the piping connecting the vertical riser 30d with the confectionery machine (not shown).

In practice it has been found that the tempering chamber 34 of the invention functions as desired when the conduit 30 has an inside diameter of about 1⅜ inch and the tubes 40a, 40b and 40c have an outside diameter of about three-fourths inch. These dimensions may be increased or decreased of course depending upon the desired throughput and rate of heat exchange to be accommodated. Using these relative dimensions of the tube within a tube heat exchanger, with three heat exchanger passes each of which is 33 inches long, it has been found that a pump 32 may be used having a capacity of up to 750 pounds of chocolate per hour. Preferably the conduit 30 and heat exchange tubes 40 are formed of copper although any suitable materials of construction may be used. While the invention as depicted in the drawings includes three parallel heat exchanger passes it will be understood that a greater or lesser number of passes may be used as well in practicing the invention.

The invention has been found to be useful in tempering not only typical commercial grades of chocolate, but also for tempering mixtures of such chocolate with additives. Additives are sometimes used to impart a pastel color to the chocolate or to cause the chocolate to dry quickly at high temperatures. It may of course be desirable to vary the cooling and heating cycles as described above to accommodate use of different chocolate containing compositions.

One of the advantages of the invention is that it is useful for tempering chocolate for use in any of the commercial confection manufacturing operations. Because of the precision as well as range in heat treatment and temperature control that can now be applied to tempering of chocolate, the invention makes it possible to achieve precisely the proper degree and form of incipient crystallization of the chocolate. By use of the invention it is possible to control the chocolate temperature during crystallization to within a fraction of one degree F. of the desired temperature. The significance of this advance will be appreciated from the fact that chocolate can lose its temper under some circumstances with a variation of as little as one degree F. in its temperature.

Still another advantage of the invention is that it is no longer necessary to use bulky and expensive water cooling equipment in the tempering of chocolate. In the past, use of such equipment, which conventionally included expensive water coolers or chillers, added appreciably to the cost of tempering and required a ready and cheap source of cooling water. By contrast, the instant invention utilizes a self-contained, internally refrigerated cooling-heating system that does not require a source of cooling water or water cooling equipment for its use.

Yet another feature of the invention is that for hollow molding applications tempered chocolate may be produced which is slightly higher in temperature than so-called "perfect temper" and yet contains sufficient crystals so that when the chocolate goes into the molds and is shaken, it flows easily yet crystallizes rapidly, both of which are desirable.

I claim as my invention:

1. An apparatus for tempering liquid chocolate to be fed to a machine for manufacturing confections or the like, comprising a reservoir for liquid chocolate, a continuous conduit connecting said reservoir with the confection manufacturing machine, a pump associated with said conduit to cause chocolate to flow from said reservoir through the conduit to the confection manufacturing machine, heat exchanger means associated with a length of said continuous conduit for alternately and cyclically cooling and heating the chocolate flowing within said conduit length, and means for alternately and cyclically cooling and heating said heat exchanger means in predetermined timed intervals to thereby temper the chocolate to the proper temperature and crystallinity for feed to the confection manufacturing machine.

2. The apparatus of claim 1 in which the heat exchanger means includes tube means disposed concentrically within said continuous conduit length for successively effecting heat transfer to and from the chocolate in the conduit length.

3. The apparatus of claim 1 in which said conduit length is at least two parallel interconnected passes.

4. The apparatus of claim 3 in which the means for alternately and cyclically cooling and heating the heat exchanger includes means for independently controlling the temperature of the chocolate flowing in each of the heat exchanger passes.

5. The apparatus of claim 2 in which the means for alternately and cyclically cooling and heating the heat exchanger means is a liquid gas refrigeration and heating system including a compressor, a condenser, and means for circulating said liquid and gas through said concentrically disposed tube.

6. The apparatus of claim 1 including electrical resistance type heating means surrounding a portion of the continuous conduit, temperature responsive means associated with the continuous conduit and in contact with the chocolate therein for sensing the temperature of the chocolate, and electrical control means operable in accordance with the demands of said temperature responsive means for controlling the flow of electrical current to said resistance type heating means.

7. The apparatus of claim 6 in which the electrical resistance type heating means comprises electrical heating tape wrapped around the exterior of the continuous conduit.

8. An apparatus for tempering liquid chocolate to be continuously applied as a coating in a chocolate coating machine of the type requiring a continuous feed of chocolate to the machine and providing a continuous discharge of excess chocolate from the machine, comprising a reservoir for liquid chocolate, a first continuous conduit connecting said reservoir with the chocolate coating machine, a pump associated with said first conduit to cause chocolate to flow from said reservoir through the conduit to the chocolate coating machine, a second conduit connecting the discharge of the chocolate coating machine with said reservoir for return of excess chocolate from the machine to the reservoir, means associated with said reservoir for feeding new chocolate to the reservoir to replace the chocolate used in the coating machine, heat exchanger means associated with a length of said first continuous conduit for alternately and cyclically cooling and heating the chocolate flowing in said conduit length to thereby temper the chocolate to the proper temperature and crystallinity for feed to the chocolate coating machine.

9. The apparatus of claim 8 in which the heat exchanger means includes tube means disposed concentrically within said first continuous conduit length for successively effecting heat transfer to and from the chocolate in the conduit length.

10. The apparatus of claim 5 in which said liquid and gas are circulated through said concentrically disposed tube in a direction opposite to the direction said chocolate flows in said conduit.

* * * * *